(12) United States Patent
Scharber et al.

(10) Patent No.: US 8,719,381 B2
(45) Date of Patent: May 6, 2014

(54) RECONFIGURABLE DOWNLOAD MANAGER

(75) Inventors: John M. Scharber, Placerville, CA (US); Andrew Lientz, Culver City, CA (US); Alexander A. Kazerani, Santa Monica, CA (US)

(73) Assignee: EdgeCast Networks, Inc., Santa Monica, CA (US)

( * ) Notice: Subject to any disclaimer, the term of this patent is extended or adjusted under 35 U.S.C. 154(b) by 431 days.

(21) Appl. No.: 12/898,688

(22) Filed: Oct. 5, 2010

(65) Prior Publication Data

US 2012/0084399 A1   Apr. 5, 2012

(51) Int. Cl.
| | |
|---|---|
| G06F 15/16 | (2006.01) |
| G06F 3/01 | (2006.01) |
| H04L 12/26 | (2006.01) |
| G06F 3/048 | (2013.01) |
| G06F 15/173 | (2006.01) |
| H04L 29/08 | (2006.01) |
| H04W 24/10 | (2009.01) |
| H04L 12/18 | (2006.01) |

(52) U.S. Cl.
CPC .......... *H04L 67/34* (2013.01); *H04L 29/08117* (2013.01); *H04L 67/06* (2013.01); *H04W 24/10* (2013.01); *H04L 12/1863* (2013.01)
USPC ........... 709/219; 709/218; 709/224; 709/232; 715/738; 715/748; 715/771; 370/252

(58) Field of Classification Search
CPC ... H04L 67/34; H04L 67/06; H04L 29/08117; H04L 12/1863; H04W 24/10
USPC ......... 709/220, 223, 224, 206, 217–219, 232, 709/242; 705/52, 14, 26.1; 707/9, 999.009; 370/313, 252, 429; 715/738, 748, 771, 715/838; 463/40, 42; 714/710
See application file for complete search history.

(56) References Cited

U.S. PATENT DOCUMENTS

| | | | |
|---|---|---|---|
| 5,305,195 | A | 4/1994 | Murphy |
| 5,347,632 | A | 9/1994 | Filepp et al. |
| 5,572,643 | A | 11/1996 | Judson |
| 5,848,396 | A | 12/1998 | Gerace |
| 5,848,397 | A | 12/1998 | Marsh et al. |
| 5,933,811 | A | 8/1999 | Angles et al. |
| 5,948,061 | A | 9/1999 | Merriman et al. |
| 5,991,735 | A | 11/1999 | Gerace |
| 6,108,703 | A | 8/2000 | Leighton et al. |
| 6,553,413 | B1 | 4/2003 | Lewin et al. |

(Continued)

*Primary Examiner* — Wing F Chan
*Assistant Examiner* — Raji Krishnan
(74) *Attorney, Agent, or Firm* — Los Angeles Patent Group; Arman Katiraei

(57) ABSTRACT

Some embodiments provide a reconfigurable tool for managing the downloading of content from, while reporting information to, various content providers and Content Delivery Networks (CDNs) through a single installed instance of the reconfigurable tool. In some embodiments, the tool includes a container application that is used to download content that is supplied by various content providers. The tool also includes a configuration file. The configuration file configures operation of the application to download content from a particular content host. The configuration also specifies reporting parameters that identify what information to report, when to report the information, and to whom the information is reported as part of the content download. Using this tool, content providers and CDNs are able to provide customizable and unique user experiences without modifying the code base of the application and without having to develop and maintain their own proprietary download manager applications.

18 Claims, 10 Drawing Sheets

(56) References Cited

U.S. PATENT DOCUMENTS

| | | |
|---|---|---|
| 7,103,645 B2 | 9/2006 | Leighton et al. |
| 2002/0161767 A1* | 10/2002 | Shapiro et al. ............... 707/9 |
| 2007/0094142 A1* | 4/2007 | Russell et al. ............. 705/52 |
| 2007/0121534 A1* | 5/2007 | James et al. ............. 370/313 |
| 2008/0010117 A1* | 1/2008 | Oliveira et al. ............. 705/14 |
| 2009/0310501 A1* | 12/2009 | Catovic et al. ............ 370/252 |
| 2010/0011093 A1* | 1/2010 | Gordon ..................... 709/219 |
| 2011/0154213 A1* | 6/2011 | Wheatley et al. ........... 715/738 |

\* cited by examiner

```xml
<?xml version="1.0" encoding="utf-8"?>                          — 510
<downloadManager>
    <version>1.0</version>
    <vendor>Content Delivery Network, Inc.</vendor>              — 520
    <partner>
        <name>Content Providers company name</name>
        <customerAccount>231231231231231123123</customerAccount>
        <escalate>
            <escalationLink>http://www.contentprovider.com/path/
            raiseError.php?arg1=aaaaaa</escalationLink>
            <escalationConact>Customer Representative Name</escalationConact>
            <escalationPhone>+1 (888) 888-8888</escalationPhone>
            <escalationChat>gtalk:chat?jid=foo@gmail.com&from_jid=bar@gmail.com
    </escalationChat> </escalate> </partner>
                                                                 — 520
    <download>
        <!-- Sequence Entity                                     — 530
            order           =    integer sequence
            type            =    download|executable
            progressWindow  =    T/F - display progress view
            interActionWindow =  T/F- display interaction view
            resource        =    URL|CMD
        -->
        <sequence order="1" type="download" progressWindow="true"
            interactionWindow="true" maxTime="3000"
            resource="http://www.contentprovider.com/resourcePath/file.zip">

<!-- InterAction Entity - what to display in the interaction view
                type      =  flash|html|dialogContinue|dialogWarning|dialogInfo
                maximize  =  T/F – max interaction view and min progress view
                resource  =  URL | CMD
                maxTime   =  seconds - raise event if download time exceeds value
                title     =  text for title
                body      =  text for body
            -->
            <interAction type="flash" maximize="true"
            resource="http://www.mypartner.com/file.swf"></interAction>
```

RECONFIGURABLE DOWNLOAD MANAGER

TECHNICAL FIELD

The present invention relates to tools and methods for downloading content.

BACKGROUND ART

The Internet provides a platform through which data can be exchanged between end users that are located all across the world. Providers of content including audio and video media (e.g., songs, movies, video games, etc.), applications (e.g., Adobe's® Creative Suite and Microsoft's® Office), and electronic services (e.g., remote bug fixing) have realized how they can leverage this platform in order to improve the distribution of their content. Specifically, such content used to require a trip to a brick-and-mortar store in order to purchase a physical medium on which the content was stored. Now such content can be identified by, downloaded to, and executed on an end user's machine (e.g., computer or electronic device) without ever leaving one's home or office. The end user can even acquire the content while on-the-go using 3G or 4G wireless data networks (e.g., Worldwide Interoperability for Microwave Access (WiMAX) and Long Term Evolution (LTE)).

This distribution model lowers the cost in obtaining the content as physical media transfer, packaging, and the intermediary retailer are eliminated. Furthermore, this distribution model provides the convenience of searching and comparing content from one's machine at any time of day with delivery of the content beginning as soon as the end user clicks on a link. As a result, the way in which end users obtain much of their music, movies, games, and other digital content occurs across data networks such as the Internet.

A problem many users have with this distribution model is with the time needed to download the content. Such content may include software applications, video games, movies, etc. that are on the order of hundreds of megabytes or several gigabytes. It takes several minutes or hours to completely download such content using high speed data connections. During the download period or when the end user realizes the amount of time needed to complete the download, the end user may lose interest in the content and, as a result, cancel the download. Downloads may also be canceled because of network failures, hardware failures, or software failures. As a result of some such failures, the end user downloads the same content from the beginning. Having to redownload content may result in the end user altogether canceling the download. Cancellation of a download can result in a lost transaction which in turn can result in lost revenue to a content provider or a distributor of content, such as a Content Delivery Network (CDN).

Various download managers have been developed to remedy the problems associated with downloading large content or large amounts of content. A download manager is a software application, script, or set of executable instructions that runs on the end user machine and allows a download to be paused, resumed, or reestablished. Using the download manager, the end user can complete a download through a set of discontinuous download sessions. In the event of failure, the download manager allows an end user to continue a download from the point of failure. Additionally, some download managers provide information for troubleshooting issues that occur during a download, such as a firewall setting that prevents content from being downloaded.

However, current download managers have several shortcomings that limit their use or cause them to be used only when required. Many download managers are generic to the point of offering only basic pause and resume functionality without any of the reporting or other specialized functionality. In some such instances, the download manager is seen as an unnecessary "bloatware" application.

Other download managers are specific to a particular content provider and provide specialized functionality, but only for that particular content provider. For example, when an end user purchases and downloads a music file from Amazon.com, the end user first downloads and installs the Amazon.com download manager. When the same end user purchases a music file from the iTunes music store, the end user first downloads and installs the iTunes application which comes integrated with its own download manager. As a consequence, the end user duplicates the effort and time that is spent downloading and installing a download manager. Some end users may opt out of the download when they realize the added steps and time that are needed to install a different download manager. Other end users may not wish to alter their machines by installing additional software for fear of adding bloatware, malware, or software that originates from a site or vendor that is not trusted. Furthermore, such a proprietary download manager imposes various burdens on the content provider. Specifically, the content provider will experience development costs in order to develop the download manager application with the desired specialized functionality. These development costs are further exacerbated when the application is required to support end users with machines that run on different platforms. Moreover, the content provider will require additional network infrastructure to distribute not only its content but also the proprietary download manager application.

Some such obstacles may be overcome by using a CDN to distribute the content on behalf of the content provider. Specifically, the CDN provides an infrastructure with sufficient bandwidth and computing resources to distribute large amounts of content to large quantities of end users. However, to download the content from the CDN, the end user in many instances first downloads and installs a download manager of the CDN. A shortcoming of the CDN download manager is that it is controlled and managed by the CDN. Accordingly, the download manager cannot be customized on a per content provider basis. Consequently, the CDN download manager is usually an ineffective reporting or analytic tool for the content providers whose content is distributed by the CDN. Even when the CDN download manager provides some reporting, it is often the case that such reporting does provide detailed information to the content provider since the download manager is usually provided only a URL from which to download content from the CDN. This URL does not identify the end user, an order number, or other information that provides the content provider with valuable information when analyzing the other reported information. To alleviate this problem, some CDNs utilize different download mangers for content supplied by different content providers. However, this reintroduces the earlier problem in which end users download and install different download managers for different content providers.

Accordingly, there is a need to provide a unified download manager that manages content downloads from multiple content providers and/or CDNs such that a separate instance of a download manager need not be installed when content is supplied by a different content provider. There is a need for such a download manager to be able to report information back to any desired destination irrespective of where the content is downloaded from. There is a need for flexibility in the download manager and in the reporting such that content providers can specify what information is important to report. Moreover, there is a need for the download manager to engage the end user during a download to minimize the possibility of the end user canceling a download before it is completed.

SUMMARY OF THE INVENTION

Some embodiments provide a reconfigurable tool for managing the downloading of content from, while reporting information to, various content providers and Content Delivery Networks (CDNs) through a single installed instance of the reconfigurable tool. In some embodiments, the reconfigurable tool is a cross platform application (i) that supports core download management functionality such as pausing, resuming, and reestablishing of downloads and (ii) whose look, operation, and reporting can be fully customized using a configuration file.

In some embodiments, the configuration file is dynamically generated in order to customize the look, operation, and reporting of the download manager on a per content provider, per end user, per downloaded piece of content, or per download event basis. The configuration file may include: (i) links to one or more files to be downloaded, (ii) content to customize the display of the download manager, (iii) operations that are conditionally triggered while downloading, and (iv) a reporting configuration to specify what information the download manager reports, where to report the information, and when to report the information.

The display of the download manager can be customized with branding, engaging content, and advertisements as specified by the configuration file author. In some embodiments, the engaging content and advertisements are targeted to the end user based on the content the end user has selected to download or based on end user account information. The engaging content includes interactive content or video content to keep an end user engaged in a download. In so doing, the likelihood of the end user cancelling the download before completion is reduced.

The customized reporting of some embodiments allows content providers and CDNs to identify errors that were encountered during a download, obtain performance metrics (e.g., latency, jitter, time to download, etc.) that are associated with downloading content from various servers, obtain statistics (e.g., what content was downloaded the most) about the content being downloaded, record billable events, and obtain other informational data (e.g., end user identification and order numbers). Content providers and CDNs can use the reported information to distinguish between effective and ineffective downloads, to distinguish between effective and ineffective download manager configurations, to track and monitor downloads, to determine that a series of events has completed resulting in a chargeable action, and to identify specific end user problems and reasons for failed downloads.

Through the reconfigurable download manager, different content providers and CDNs are able to provide fully customizable and unique user experiences without modifying the code base of the application and without having to develop and maintain their own proprietary download manager applications. As a result, end users no longer have to install different download management applications when downloading content from different content providers or CDNs.

BRIEF DESCRIPTION OF THE DRAWINGS

In order to achieve a better understanding of the nature of the present invention, a preferred embodiment of the reconfigurable download manager will now be described, by way of example only, with reference to the accompanying drawings in which.

DETAILED DESCRIPTION

In the following detailed description, numerous details, examples, and embodiments of a reconfigurable download manager are set forth and described. It will be clear and apparent to one skilled in the art that the reconfigurable download manager is not limited to the embodiments set forth and that the reconfigurable download manager may be practiced without some of the specific details and examples discussed.

I. Overview

Some embodiments provide a reconfigurable tool for managing the downloading of content from, while reporting information to, various content providers and Content Delivery Networks (CDNs) through a single installed instance of the reconfigurable tool. In some embodiments, the reconfigurable tool is a cross platform application (i) that supports core download management functionality such as pausing, resuming, and reestablishing of downloads and (ii) whose look, operation, and reporting can be fully customized using a configuration file.

Figure 1:
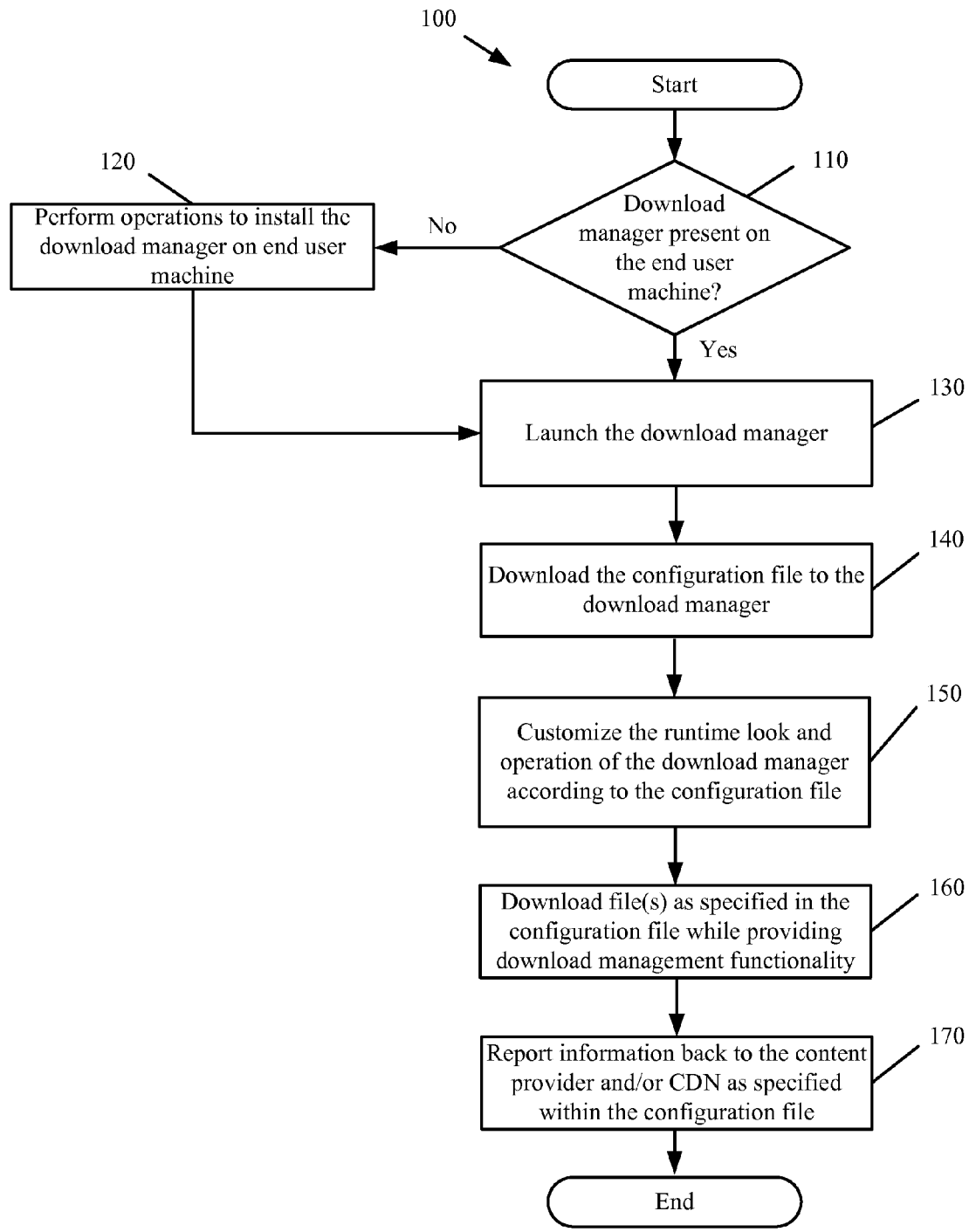
FIG. 1 presents a process for downloading content using the reconfigurable download manager of some embodiments.

FIG. 1 presents a process 100 for downloading content using the reconfigurable download manager of some embodiments. The process 100 begins when an end user invokes a link to download content from a content provider or CDN. The content provider or CDN may require that the reconfigurable download manager be present and running on the end user machine before commencing the download. Accordingly, the process determines (at 110) whether the reconfigurable download manager is present on the end user machine. When the reconfigurable download manager is not present, the process performs (at 120) a series of operations to install the reconfigurable download manager and launch (at 130) the download manager on the end user machine. Otherwise, the end user has previously installed the reconfigurable download manager and the reconfigurable download manager is launched (at 130) on the end user machine.

In some embodiments, the reconfigurable download manager is a container application whose look and operation is specified using a configuration file. In some embodiments, the link for downloading the content is a link to the configuration file. Therefore, the process downloads (at 140) the configuration file to the reconfigurable download manager as a result of the link being invoked.

The process customizes (at 150) the runtime look and configures the runtime operation of the reconfigurable download manager according to the configuration file. In some embodiments, the configuration file specifies: (i) links to one or more files to be downloaded, (ii) content to customize the display of the download manager including engaging content that keeps the end user engaged in the download and thereby reduces the likelihood of the end user cancelling the download before completion, (iii) operations that are conditionally triggered while downloading, and (iv) a reporting configuration to specify what information the download manager reports, where to report the information, and when to report the information.

The process downloads (at 160) one or more files as specified by the configuration file. When downloading, the reconfigurable download manager provides download management functionality such as pausing, resuming, and reestablishing ongoing downloads. The process reports (at 170) information back to recipients that are identified in the configuration file. The process 100 ends when the download manager has stepped through the configuration file or the download manager application is exited.

The reconfigurable download manager of some embodiments provides several advantages over current download managers. Firstly, the same reconfigurable download manager application can be reconfigured with a different configuration file in order to provide a completely different download experience when downloading different content, downloading content from a different content provider, or downloading content from the same CDN that is supplied by a different content provider. The reconfigurable download manager can be reused by different content providers and CDNs while still allowing the content providers or CDNs the ability to fully customize the look and operation of the download manager.

Secondly, the end user downloads and installs the download manager one time. Once installed, the look of the download manager can be customized and the operation of the download manager can be configured per each end user, each content provider, or each CDN as specified by a configuration file author. Moreover, such customization and configuration can be achieved without modifying the code base of the download manager application. Specifically, the configuration file of some embodiments is defined using a set of entities with settable attributes. By specifying the entities and setting the attributes, the configuration file author can achieve a customized look and operation for the download manager without altering the code base of the reconfigurable download manager application.

Thirdly, the reconfigurable download manager allows content providers or CDNs to provide end users with engaging content to keep the end users engaged when performing long duration downloads. Rather than present a progress bar or static content to all end users, the configuration files can be dynamically authored to cause the download manager application to display engaging content that is relevant to purchases, activities, or interests of the end user. Moreover, the configuration files can be authored to dynamically change the engaging content based on various specified events that are triggered during the download. In so doing, the end user remains engaged during the content download. Consequently, the end user is less inclined to cancel a download that has begun, thereby improving the rates for completing transactions with a content provider or CDN. These improved rates translate into additional purchase orders being fulfilled which results in greater revenue to the content provider or CDN.

Fourthly, using the configuration file, the download manager can be configured to perform customized reporting to any recipient. Moreover, such customized reporting occurs without having to reinstall the download manager or manually configure the download manager. The reporting increases the download manager's effectiveness by providing content providers and CDNs with errors that were encountered during a download, performance metrics (e.g., latency, jitter, time to download, etc.) that are associated with downloading content from various servers, obtain statistics (e.g., what content was downloaded the most) about the content being downloaded, record billable events, and obtain other informational data (e.g., end user identification and order numbers). Content providers and CDNs can use the reported information to distinguish between effective and ineffective downloads, to distinguish between effective and ineffective download manager configurations, to track and monitor downloads, to determine that a series of events has completed resulting in a chargeable action, and to identify specific end user problems and reasons for failed downloads.

Figure 2:
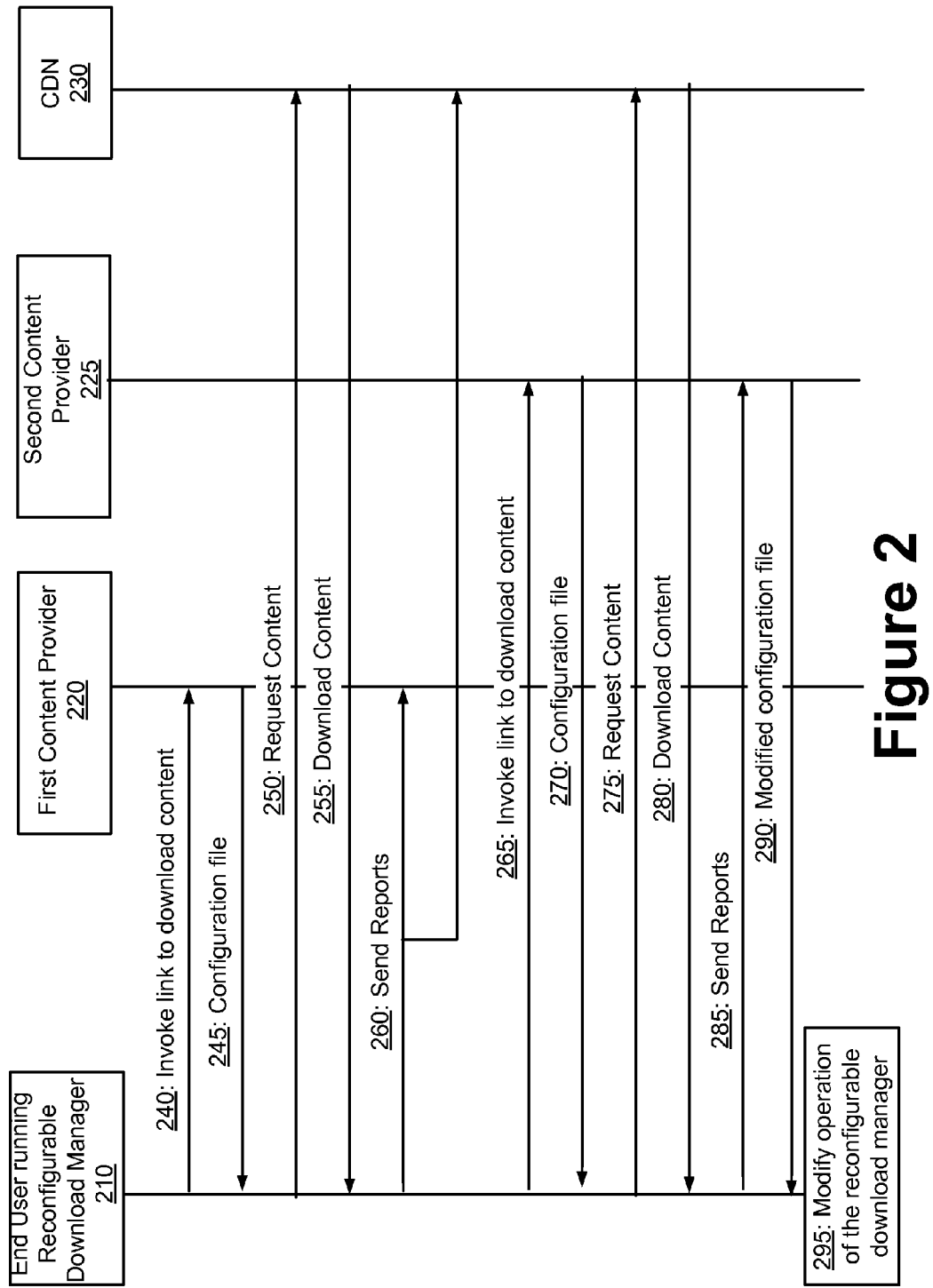
FIG. 2 presents a flow diagram to illustrate some of the advantages of the reconfigurable download manager of some embodiments in the context of a CDN.

FIG. 2 presents a flow diagram to illustrate some of the advantages of the reconfigurable download manager of some embodiments in the context of a CDN. As shown, a particular end user 210 running the reconfigurable download manager application downloads first content that is supplied by a first content provider 220 and second content that is supplied by a second content provider 225 from a CDN 230 that hosts each of the first and second content.

To begin the download of the first content, the end user 210 invokes (at 240) a link at a website of the first content provider 220. In response, the first content provider 220 provides (at 245) the end user 210 with a configuration file. The configuration file launches the reconfigurable download manager on the end user machine, customizes the look of the download manager, and configures the operation of the download manager to request and download the first content from the CDN 230. Specifically, the provided configuration file contains the URL or IP address and any other relevant information (e.g., authentication parameters) for downloading the first content from the CDN 230.

The end user 210 requests (at 250) the first content from the CDN 230. The CDN 230 commences the download and the requested content is downloaded (at 255) to the end user 210. While downloading, various reporting events that have been configured in the operation of the download manager are triggered. These events cause the download manager to send (at 260) various reports regarding the download from the end user machine 210 to each of the first content provider 220 and CDN 230. In some embodiments, the end user 210 sends different reports at different times to the first content provider 220 than to the CDN 230 as specified by the configuration file.

To begin the download of the second content, the end user 210 invokes (at 265) a link at a website of the second content provider 225. The second content provider 225 provides (at 270) the end user 210 with a different configuration file. This configuration file again changes the look and operation of the download manager. This configuration file contains the URL or IP address and any other relevant information for downloading the second content from the CDN 230. As above, the end user 210 requests (at 275) and downloads (at 280) the second content from the CDN 230. However in this figure, the configuration file provided by the second content provider 225 configures the download manager to send (at 285) reports regarding the download of the second content from the end user 210 to the second content provider 225.

In this manner, the reporting of the reconfigurable download manager is changed on-the-fly without altering the code base of the reconfigurable download manager application. This ability to download content from a CDN while reporting information to the provider of the content provides incentives for both the CDN and the content provider. Specifically, the CDN provides the content provider with a platform to which it can offload its content for distribution. The reconfigurable download manager provides the CDN with a tool that the content provider can customize to control what information is reported back to it when its content is downloaded from the CDN.

In some embodiments, the reconfigurable download manager provides a means with which the content provider can customize the end user download experience on-the-fly and in real-time as the end user downloads content from the CDN 230. In FIG. 2, the second content provider 225 sends (at 290) a modified configuration file to the end user 210 in response to information that was included within the reports that were sent at step 290. The modified configuration file on-the-fly and in real-time modifies (at 295) the operation of the download manager running on the end user machine 210 as it continues to download content.

II. Download Manager

In some embodiments, the download manager is a cross platform application that can be installed and run on a variety of operating systems (e.g., Windows 7, OS X, Linux, etc.) and across various end user machines (e.g., computers, mobile devices, and game consoles). For example, the download manager may be developed using the Adobe Air platform or Java platform.

Such a cross platform application reduces the development effort as one version of the download manager application is created for several systems and platforms. The ability to reconfigure the download manager further reduces the development effort as content providers and CDNs can abandon their own development efforts devoted to maintaining their proprietary download managers. Instead, by adopting the reconfigurable download manager, they are provided a shared code base that can be developed by one party and reused by all parties. In so doing, the content providers and CDNs can shift their focus to providing end users with a better overall user experience by optimizing the customization and operation of the download manager with the configuration file. Additionally, the reconfigurable download manager provides cost savings in that content providers no longer have to maintain and develop a proprietary download manager application and bandwidth savings as content providers no longer have to distribute the proprietary download manager.

Figure 3:
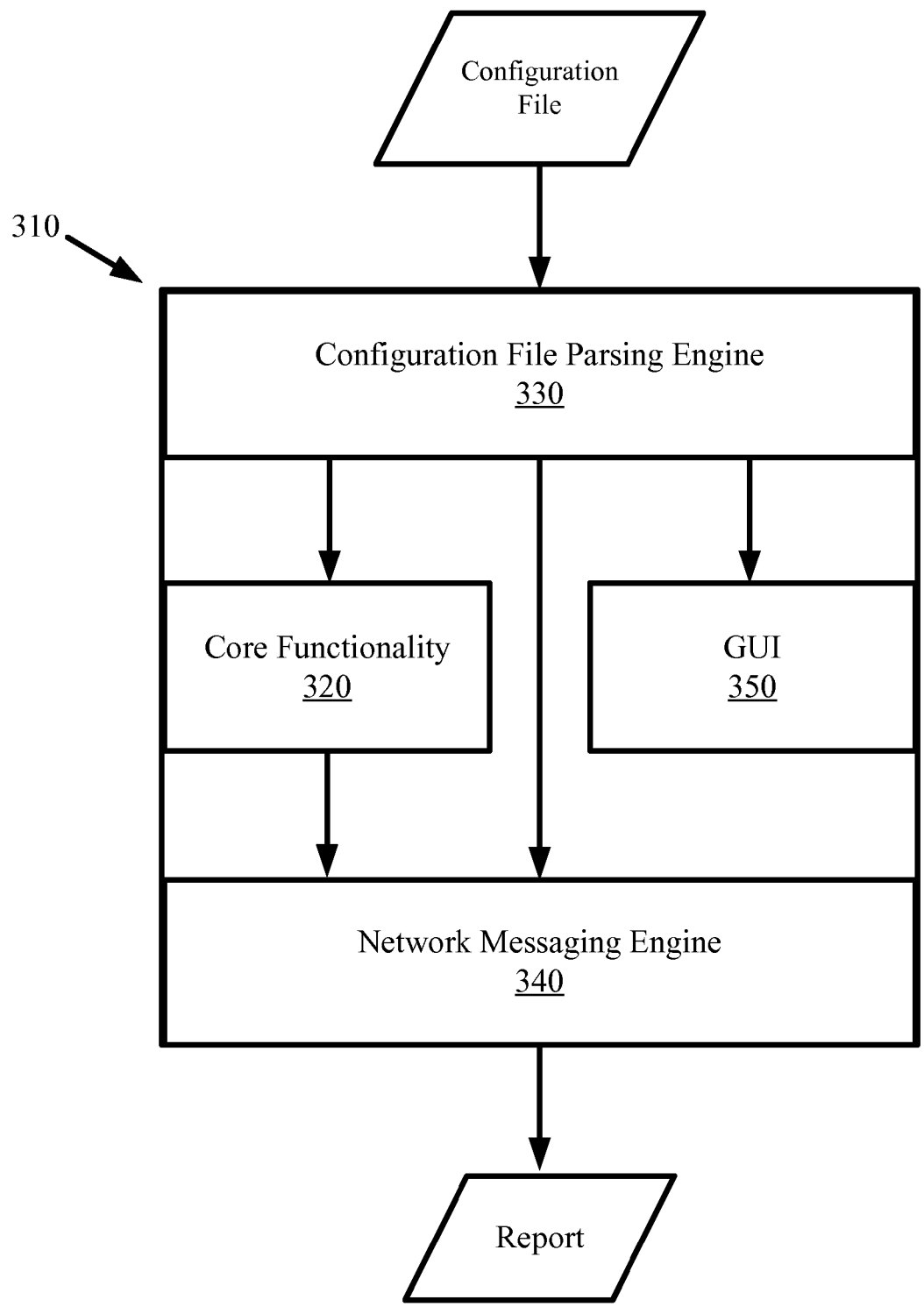
FIG. 3 illustrates the reconfigurable download manager application in accordance with some embodiments.

FIG. 3 illustrates the reconfigurable download manager application 310 in accordance with some embodiments. As shown, the reconfigurable download manager 310 includes core functionality 320, configuration file parsing engine 330, network messaging engine 340, and graphical user interface (GUI) 350.

The core functionality 320 allows for a download to be paused, resumed, or reestablished. The core functionality 320 may optionally provide support for (i) multiple concurrent connections for distributed content downloads whereby different segments of a particular piece of content are downloaded from different servers, (ii) downloading multiple files, (iii) client/server side bandwidth limiting, (iv) download limits, (v) Digital Rights Management (DRM), (vi) security mechanisms (e.g., authentication and authorization), (vii) digital signatures, (viii) scheduled downloads, and (ix) report generation. This core functionality may be dynamically invoked as per specifications of the configuration file or manually invoked by the end user through GUI interactions.

The configuration file parsing engine 330 receives a configuration file as input and parses through the various entities defined therein. While parsing the entities, the parsing engine 330 executes the operations specified by the entities. Such operation execution may invoke various core functionality, modify the configuration of the download manager, modify the operation of the download manager, generate reporting messages, and change the GUI display of the download manager. In some embodiments, the configuration file entities may specify or link to other applications (e.g., Adobe® Flash), scripts (e.g., JavaScript), or content. Accordingly, the parsing engine 330 is responsible for running these applications, scripts, or content. The configuration file is described in Section III below.

The network messaging engine 340 controls the sending and receiving of reporting messages. Reports may be sent to one or more recipients using email or other messages (e.g., HTTP, TCP, UDP, etc.) that identify the recipients using URLs or IP addresses. Section IV below describes the reporting functionality of the reconfigurable download manager of some embodiments.

Figure 4:
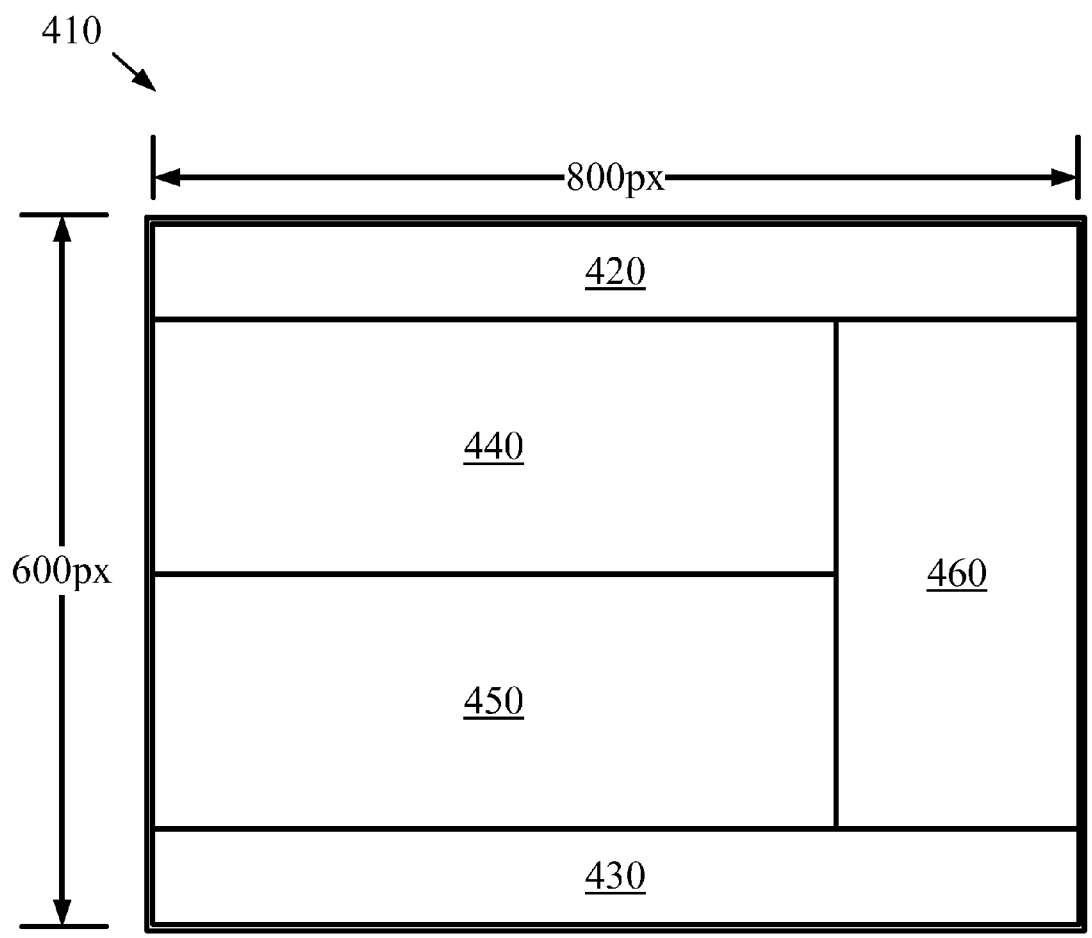
FIG. 4 illustrates the views of the download manager in accordance with some embodiments.

In some embodiments, the GUI 350 includes a set of standardized buttons or other graphical elements (e.g., menu items) for pausing, resuming, or reestablishing a download in addition to other core functions. Additionally or alternatively, the GUI 350 includes customizable views with which to display custom information to the end user. FIG. 4 illustrates the views of the download manager 410 in accordance with some embodiments. As shown, the download manager 410 includes a set of views 420, 430, 440, 450, and 460 that may be static or dynamically customized based on the configuration file.

In some embodiments, the views 420 and 430 are used as a header and a footer for the reconfigurable download manager application window. Specifically, the view 420 is for displaying header information and branding of a content provider such as the content provider logo. The view 430 is a footer for displaying branding of a CDN, content provider partner, or additional branding of the content provider. Branding may include a graphic, animation, logo, or text. Branding may also include clickable graphics that are embedded with one or more hyperlinks that forward an end user to a specified website when the graphic is clicked.

The view 440 may be configured to display a progress bar. The progress bar indicates the amount of downloaded content and the amount of content that remains to be downloaded. The view 440 may display other progress information such as elapsed time since the download began or which content in a sequence of content is currently being downloaded. The view 440 may be a tab bar or window that can be titled independent of the other views.

The view 450 may be configured to display engaging content. The engaging content may include graphics, videos, games, or other content that keeps the end user engaged while performing a download. The engaging content may be interactive such that the end user is able to interact with the content using keyboard, mouse, or touch controls. For example, when downloading a video game, the view 450 may be configured to display a mini-game from the video game that is being downloaded. Such interactive content may be downloaded as JavaScript or as Adobe Flash content. Alternatively, the view 450 may be configured to display a brief video or interactive tutorial about the controls of the video game or the video game itself. In some embodiments, such content is streamed to the download manager as it downloads other content. The streaming may occur from the content provider, CDN, or third party partner. Such content may also be downloaded prior to beginning the content download or may be included as part of the download manager installation. In some embodiments, the view 450 is a tab bar or window that can be titled or styled per content provider or CDN specifications.

The view 460 may be configured to display various advertisements during the download. In some embodiments, the advertisements are targeted to the end user based on what the download manager application is downloading. For example, if the download manager application is downloading content that is developed by a particular company, the advertisements may be used to notify the end user of other content of the particular company.

Each of the views 420-460 can dynamically change when the download manager is downloading one or more files. Specifically, the configuration file may specify various triggering events that cause one or more of the views 420-460 to change. For example, when an end user begins a download, the view 460 can change to display advertisements that are particular to the content being downloaded. As another example, when a download is paused, the view 450 can change to display an interactive game that could cause the end user to resume the download as the game is played within the view 450. Customizing and configuring the views 420-460 using the configuration file is described in Section III below.

In some embodiments, the views of the download manager are fixed in location and size. For example, in FIG. 4, the length of the download manager is defined to be 800 pixels and the width of the download manager is defined to be 600 pixels. It should be apparent to one of ordinary skill in the art that the download manager can be any varying length or width and is not constrained to the dimensions presented in FIG. 4.

In some embodiments, content providers or CDNs can customize the position and dimensions of the download manager application and its views. In some such embodiments, the download manager is a HyperText Markup Language 5 (HTML5) application in which the look of the application is specified using Cascading Style Sheets (CSS) that the content provider or CDN is provided access to. Accordingly, the default layout of the download manager can be overwritten by changing the CSS code without having to download and reinstall the download manager.

Once the reconfigurable download manager is installed to an end user machine, the download manager can be used to download content from various content providers or CDNs. However, to ensure that the download manager is installed on the end user machine, some embodiments provide scripting code (e.g., Adobe Flash) that is to be included as part of a content download button or link. When the content download button or link is invoked by the end user, the script executes. First, the script determines whether the end user machine has the appropriate runtime environment (e.g., Adobe Air) installed. Second, the script determines whether the download manager is installed on the end user machine. In some embodiments, these determinations are made by checking one or more directory paths or registry settings on the end user machine. When either the runtime environment or download manager is not installed, the script provides a notification to the end user asking the end user to download the necessary components from a site before proceeding with the download. In some embodiments, the script provides the appropriate links from which to download the missing software components.

III. Configuration File

In some embodiments, the configuration file customizes the display of the download manager and configures the operation of the download manager. The configuration file is defined using open formats such as Extensible Markup Language (XML). In some embodiments, the configuration file is defined by a schema whereby various operations, settings, and displays of the download manager can be specified using a set of defined entities. Each entity includes one or more settable attributes.

In some embodiments, the definition of the configuration file can be expanded beyond the defined entities using extensible entities and by embedding code, applications, or scripts into the configuration file. These entities, code, applications, and scripts are executed by the parsing engine of the download manager.

The configuration file may be hosted at a content provider's site, at a server of a CDN, or at some other location in the Internet. When the end user clicks on a link for initiating a download, the configuration file is passed to the end user machine where it is processed by the download manager. Specifically, when the download manager is installed on the end user machine, it registers itself as a particular file type handler for the configuration file (e.g., *.dlm). Once the end user clicks on a download link that downloads a configuration file to the machine, the download manager is automatically launched as the application for handling the configuration file.

In some embodiments, the configuration file is statically generated such that each end user that clicks on a particular download link is provided with the same configuration file. In some embodiments, the configuration file is dynamically generated. When dynamically generated, each end user that clicks on a particular download link is provided with a configuration file that is generated on-the-fly. The configuration file may be dynamically populated with links to content that the end user has selected to download, information particular to the end user (e.g., account information or order numbers), operational parameters that are specific to the end user, or a reporting configuration that is particular to the end user. For example, the configuration file at an e-commerce site may be dynamically generated based on contents of each end user's shopping cart and information about the end user. Different end users select different content to download. Therefore, the site generates different configuration files that contain different links to the various selected content. In this manner, content providers and CDNs can define multiple experiences based on a request by request basis.

To dynamically generate the configuration file, the content provider server takes as input information that is derived from the end user. This information may include end user account information and purchase information. This information may already be present within the content provider's Customer Relationship Management (CRM) systems or other such systems. The server performs a configuration file generation process to generate the custom configuration file based on these inputs. The generated configuration file is then associated with a download link (e.g., shopping cart checkout button) that is presented to the end user. When the end user clicks on the link, the configuration file is passed to the end user machine.

Figure 5:
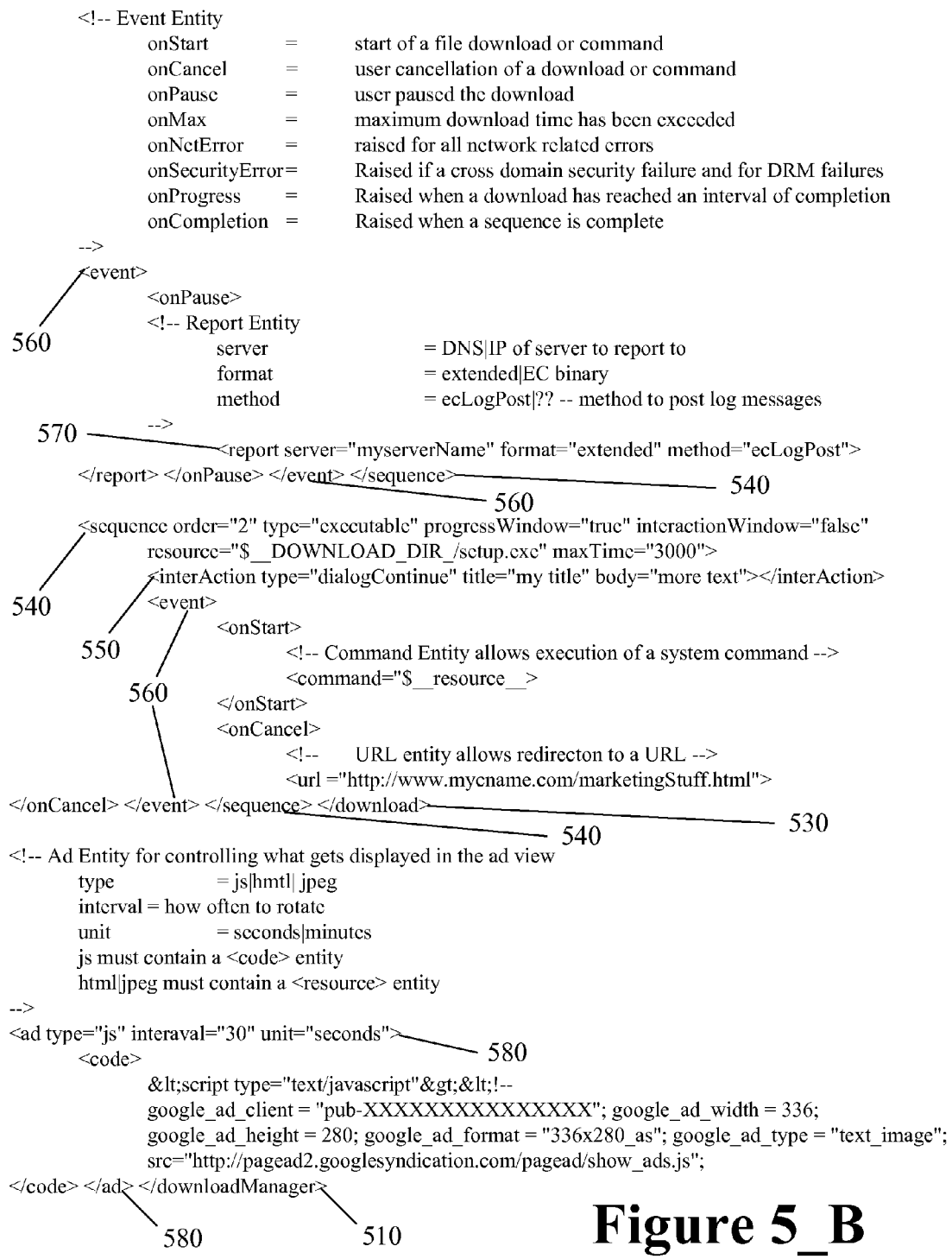
FIG. 5 presents an example of a configuration file that can be used to customize and configure the download manager in accordance with some embodiments.

FIG. 5 presents an example of a configuration file that can be used to customize and configure the download manager in accordance with some embodiments. The configuration file includes various entities 510-580 and the associated attributes.

In some embodiments, the <downloadmanager> entity 510 identifies the beginning of the configuration file and is the first entity that is processed by the download manager. Encompassed within the scope of the <downloadmanager> entity 510 are other entities for specifying global parameters and localized parameters that customize and configure the look and operation of the download manager for one or more download sessions. In some embodiments, the global parameters specifies a version number, content provider identification information, CDN information, and/or end user information.

In some embodiments, the <partner> entity 520 specifies information about a content provider whose content is being downloaded. The information can include information such as the company name, content provider identification number used to identify a content provider when the content is hosted by a CDN, information about the end user who is requesting the content, and escalation information in the event of a failed or interrupted download. Below is an example of the <escalate> entity:

```
<escalate>
    <escalationConact>Customer Experience</escalationConact>
    <escalationPhone>+1 888 888-8888</escalationPhone>
    <escalationChat>gtalk:chat?jid=foo@gmail.com&from_jid=
bar@gmail.com</escalationChat>
</escalate>
```

The above <escalate> entity includes attributes for presenting the end user with contact information (e.g., name and telephone number) and a link to open a chat session with online customer support in the event of a failed or canceled download.

The <download> entity 530 identifies the files to be downloaded and operations to perform as part of the download session. The <download> entity 530 may include one or more <sequence> entities 540 that may include one or more <interaction> entities 550 or <event> entities 560.

The <sequence> entity 540 defines the workflow for a download session and the order with which the download manager proceeds during the download session. More specifically, each <sequence> entity 540 specifies attributes for downloading a particular piece of content. An end user that is downloading a single piece of content would be provided with a configuration file with a single <sequence> entity 540 specified and an end user that is downloading three pieces of content would be provided with a configuration file with three <sequence> entities 540 specified. As part of each content being downloaded within a <sequence> entity 540, the look and operation of the download manager can be customized with the <interaction> entities 550 or <event> entities 560.

The <interaction> entity 550 controls what is displayed within the views of the download manager. The attributes of this entity can be set to display images, animations, videos, games, Flash content, HTML content, interactive messages, text, or streaming content as some examples. Such content can be obtained from any server accessible via a URL or IP address. For example: <interaction type="flash" maximize="true" resource="http://www.samplesite.com/flashapp.swf> </interaction> specifies displaying Flash content from a particular URL.

The <event> entity 560 alters the flow within an <sequence> entity 540 or <interaction> entity 550 based on a system or network event. Specifically, the <event> entity 560 causes the download manager to perform some action at different states of the download or when different conditions are triggered. These actions include: (i) changing a view of the download manager, (ii) commencing a different download, (iii) reporting statistics or information, (iv) downloading and displaying different engaging content, and (v) executing a script, system call, application, or some operation that is specified with one or more instructions.

Some defined events include the <on Start> event that is triggered when a new sequence or download commences and the <on Progress> event that is triggered when a download reaches a percentage that is specified as an attribute of the event. Other defined events can be triggered when the download reaches a certain time duration (e.g., one hour into the download), a specified number of files have been downloaded, a particular file name has been downloaded, etc. For purposes of simplicity, a full listing of the <event> entities 560 is not provided.

The following entity sequence is an example of triggering an action using the <event> entity:

```
<event>
    <onPause>
        <interaction view4=http://www.adserver.com/XYZ.jpg>
    </interaction> </onPause> </event>
```

The above event is triggered when a download is paused. The action performed when the download is paused includes changing a particular view of the download manager by download the XYZ.jpg image from the www.adserver.com website.

The <event> entity 560 can be used to provide internal troubleshooting or failover. For example, an <event> entity 560 can be specified such that if a particular download does not reach 10% completion within 5 minutes, the download switches from a first server and resumes on a second server. As another example, an <event> entity 560 can be specified to present escalation information if a download is not complete within a specified time interval.

The <event> entity 560 is often used in conjunction with the <report> entity 570 to trigger reporting back to the content provider or CDN when a specified event has occurred. The <report> entity 570 also specifies what information is reported and where to report the information. The <report> entity 570 is described in detail in Section IV below.

The <ad> entity 580 controls what information is displayed within the advertisement view of the download manager. The <ad> entity 580 may specify a URL to an advertisement graphic, animation, or other form of advertisement. The <ad> entity 580 may specify a URL to an advertisement server and provide various advertisement parameters so that the advertisements provided by the advertisement server are targeted to an end user according to the provided parameters.

Each of the entities 510-580 described thusfar include one or more attributes that the configuration file author can specify to customize the look or operation of the download manager. It should be apparent that the entities 510-580 can include more or less settable attributes for further customizing the download manager of some embodiments and that the configuration file can include more or less entities than those described herein.

In some embodiments, the configuration file is extensible with custom entities and attributes. For example, a configuration file author can include custom information within a configuration file using the custom entity <X-YYYYYY> where the "X-" identifies a custom entity and "YYYYYY" is a custom string. These custom entities can be placed at different levels of the configuration file. Using the custom entities, content providers can populate the configuration file with variables that can be used as values for other entities (e.g., <event> or <interaction> entities) or to provide additional information (e.g., identification information, statistics, metrics, etc.) when reporting information to the content provider or CDN.

IV. Reporting

In some embodiments, the download manager operates as a reconfigurable reporting tool. This reporting tool enables content providers and CDNs to obtain any customized set of information from the end users at the beginning of a download, during a download, and at the completion of a download. Specifically, the reporting can identify errors that were encountered during a download, obtain performance metrics (e.g., latency, jitter, time to download, etc.) that are associated with downloading content from various servers, obtain statistics (e.g., what content was downloaded the most) about the content being downloaded, record billable events, and obtain other informational data (e.g., end user identification and order numbers). From this information, content providers and CDNs are able to distinguish between effective and ineffective downloads, to distinguish between effective and ineffective download manager configurations, to track and monitor downloads, to determine that a series of events has completed resulting in a chargeable action, and to identify specific end user problems and reasons for failed downloads.

In some embodiments, the reporting functionality facilitates bidirectional communication between the download manager and the report recipient. In some such embodiments, the report recipient can dynamically alter the configuration file or directly reconfigure the download manager application in response to the reported information. For example, the download manager may send download progress reports to a CDN when it is downloading content from one or more servers of the CDN. The CDN analyzes the reports in real-time to determine whether additional servers can be used to expedite the download or whether the download manager should continue its current download from a different server that would better distribute the content to the download manager. To dynamically change the operation of the download manager, the CDN sends a modified configuration file or a set of commands to the download manager.

The customizability of the configuration file allows the reporting to be customized per end user, per content provider, per each downloaded piece of content, per a download event, or per any other parameter that is specified in the configuration file. Specifically, the configuration file author utilizes the <report> entity along with various other entities to specify what events trigger a report at what time or event during a download, what information is included within the report, and where the report is passed for storage or processing. In this manner, the triggering of a first set of events (e.g., 20% download reached) can be specified in the configuration file to send a first set of reports to a first recipient. The first recipient may be a CDN where the first set of reports identifies various download performance metrics that the CDN can analyze to improve content distribution. The triggering of a second set of events (e.g., 404 error) can be specified in the configuration file to send a second set of reports to a second recipient such as a content provider so that the content provider can troubleshoot errors encountered by the end user.

In some embodiments, the reported information is dynamically populated by the <report> entity. In some embodiments, a query string is used within the <report> entity to gather information from elsewhere within the configuration file, end user machine, or Internet. Additionally, the information may be obtained by including various system calls or scripts in the <report> entity. The obtained information can then be included as part of the report that is sent to one or more recipients. Using these tools, the configuration file can be configured to include customer account information, order number, downloaded file name, file download identifier, IP address of the host from which content is downloaded, etc. within the reported information.

In some embodiments, reports are passed to a URL or IP address specified in one or more <report> entities of a configuration file. Reports may be sent to one or more recipients using email or other messages (e.g., HTTP, TCP, UDP, etc.). In some embodiments, the reporting occurs in real-time as various events are triggered during a download session. The reports may be sent to any device with network connectivity including a database server, e-commerce billing system, order fulfillment system, or support system of a content provider or CDN.

Figure 6:
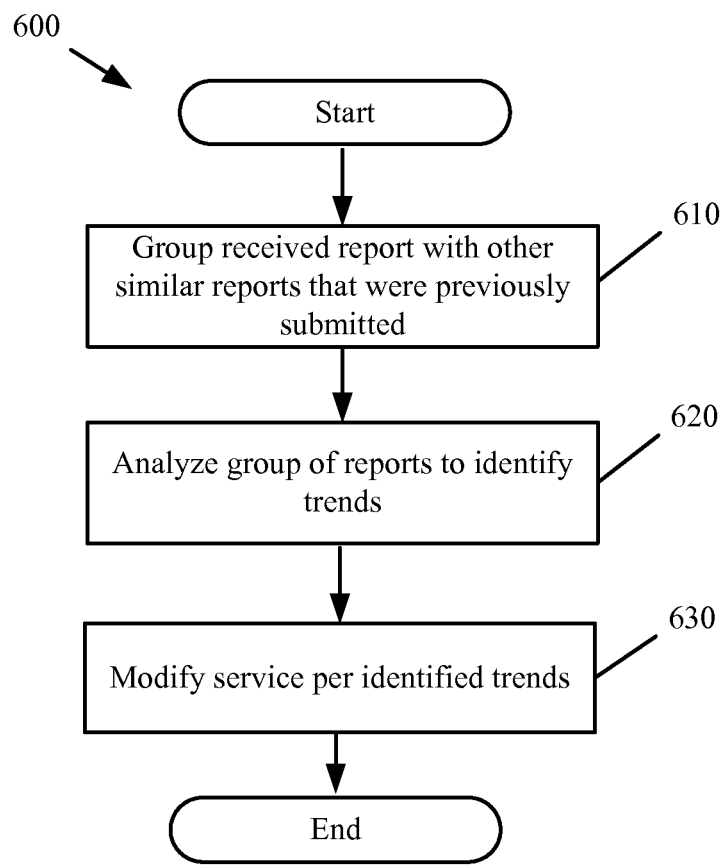
FIG. 6 presents a process for identifying trends based on download manager submitted reports in accordance with some embodiments.

The reports can be used to serve a variety of purposes for different report recipients. FIG. 6 presents a process 600 for identifying trends based on download manager submitted reports in accordance with some embodiments. This process 600 is performed on one or more machines that receive reports from one or more download managers. The process 600 begins when at least one report is received.

The process groups (at 610) the received report with other related reports to derive an aggregate set of reports. In some embodiments, the reports are grouped using selection criteria. For example, the selection criteria may group reports that were submitted within the last month or reports that were submitted as a result of downloading a particular piece of content.

The process analyzes (at 620) the group of reports to identify trends within the group. Various algorithms may be specified to perform the analysis. For example, a provider of digital music downloads may identify which music tracks were downloaded the most in the past month. As another example, a content provider may identify the price range for the most frequently purchased content of the last month. The reports can also be analyzed to monitor the effectiveness of interactive content that is provided with the configuration files. For example, the aggregated reports can be used to determine what interactive content end users most frequently viewed, clicked on, or otherwise engaged with and what content was ignored by end users.

Based on the identified trends, the process can modify (at 630) what content is offered on an e-commerce site, modify promotions to move less purchased content, or modify the configuration files that are sent to end users in an effort to keep end users better engaged in a download. Additionally, these modifications can be used to customize the user experience the next time a particular end user visits the content provider's site or can be used to customize the site for other end users.

Figure 7:
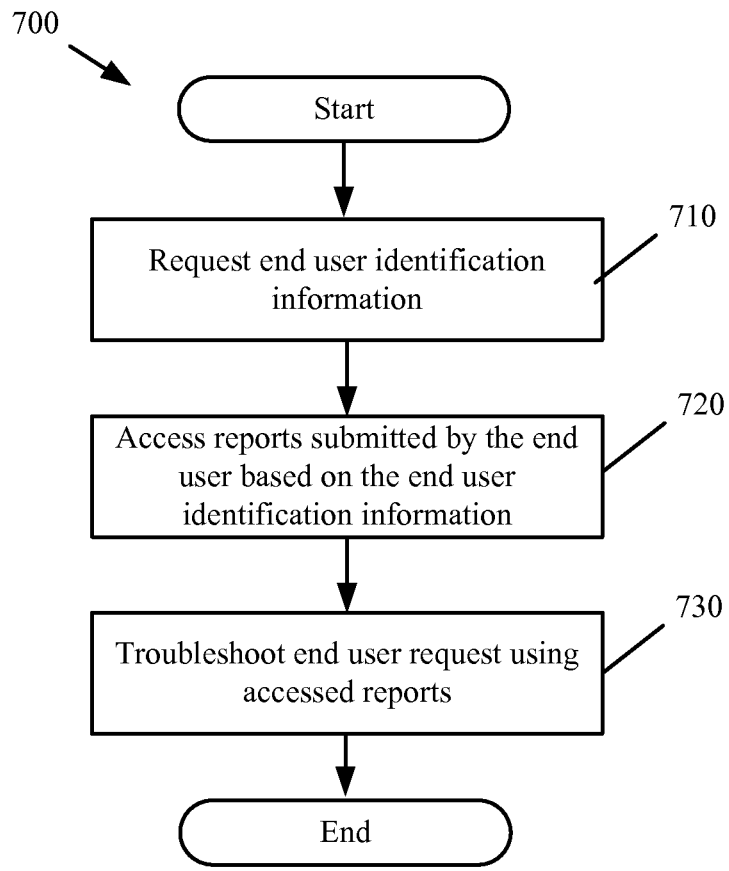
FIG. 7 presents a process for utilizing end user reports to facilitate end user support in accordance with some embodiments.

FIG. 7 presents a process 700 for utilizing end user reports to facilitate end user support in accordance with some embodiments. In this process 700, previously submitted end user reports are stored to a database such as a CRM database. The stored reports are accessed to assist customer support representatives when responding to end user help requests.

For example, the information within the report can be used to identify what content was downloaded, whether the download was complete, and possibly why the content cannot be run on an end user machine. Accordingly, the process 700 begins when an end user places a help request to a content provider or a support center that is associated with a content provider.

The process requests (at 710) end user identification information such as customer name or order number. The process accesses (at 720) reports submitted by the end user based on the end user identification information. When the identification information is an order number, the process can obtain the report that was submitted as a result of a particular download session that is associated with the order number. In this manner, the content provider representative is provided with information that can be used to identify why a particular download may have failed, why content cannot be run on an end user machine, or to verify end user allegations such as whether or not content was received by the end user. The accessed reports are therefore used (at 730) to troubleshoot individual end user help requests and the process ends.

In some embodiments, reports from other end users that downloaded the same content can be used to compare against a particular end user's submitted report in order to identify irregularities during the download. Additionally, the reports can be compared to identify an exact problem and a solution that was previously used for another end user to rectify that exact problem.

Figure 8:
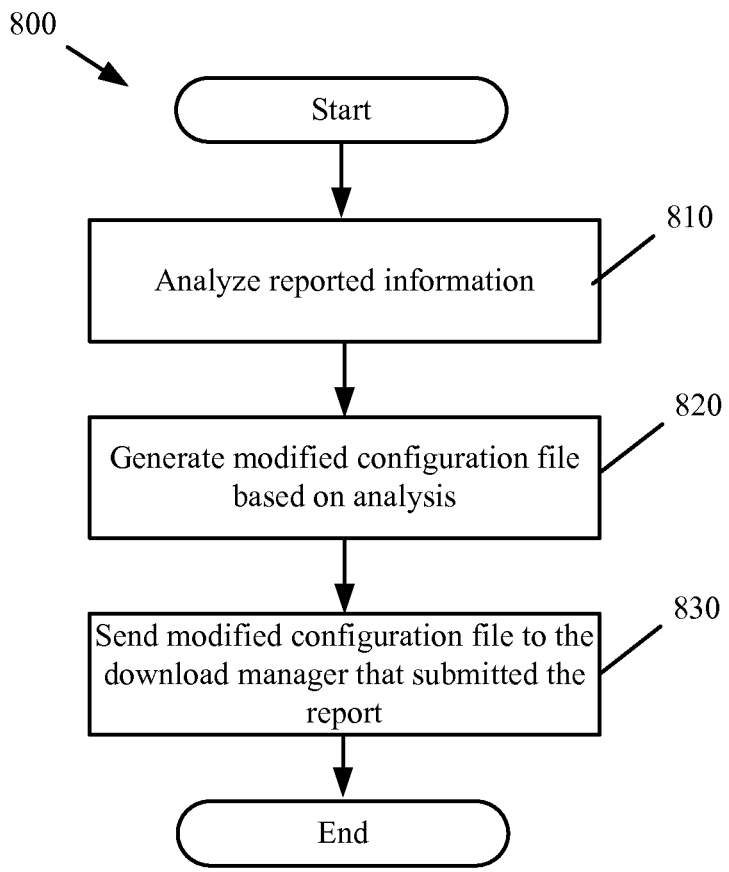
FIG. 8 presents a process for using the reporting functionality of the reconfigurable download manager to facilitate bidirectional communication between the reconfigurable download manager and a report recipient in accordance with some embodiments.

FIG. 8 presents a process 800 for using the reporting functionality of the reconfigurable download manager to facilitate bidirectional communication between the reconfigurable download manager and a report recipient in accordance with some embodiments. The process 800 begins when the recipient receives a report from the reconfigurable download manager.

The process analyzes (at 810) the report information to identify whether certain download conditions are met during a download. These download conditions can be used to ensure that the download manager is downloading content with an acceptable level of performance. For example, the report recipient may analyze the report to identify that a certain percentage of a content download is complete within a threshold time duration or that packets are not being lost during the download.

Should the recipient determine that the acceptable level of performance is not met, the operation of the download manager can be changed on-the-fly and in real-time to improve the end user experience. To do so, the process generates (at 820) a modified configuration file that is sent (at 830) to the reconfigurable download manager. In some embodiments, the received reports identify the end user machine (e.g., IP address) on which the reconfigurable download manager is running. When received at the download manager, the modified configuration file modifies the operation of the download manager while the download manager is downloading a file. In this manner, the report recipient can correct issues that occur during the download in real-time irrespective of where the download manager is downloading content from and without any effort on the part of the end user. For example, the modified configuration file causes the reconfigurable download manager to stop downloading a particular piece of content from a first hosting server of a CDN and resume the download with a second hosting server of the CDN that more optimally distributes content to the end user machine. As another example, the modified configuration file causes the reconfigurable download manager to increase the number of servers from which to concurrently download different portions of a particular content. Such on-the-fly and real-time customization allows content providers and CDNs an opportunity to ameliorate errors that could otherwise result in a failed or cancelled download.

Current download managers are unable to perform or offer the customized reporting that is provided by the reconfigurable download manager of some embodiments. Specifically, many currently download managers are limited by the information that can be reported since the download manager is often provided nothing more than a URL to content that is to be downloaded. In such instances, the download manager cannot identify the end user, order number, or other information for associating reporting information to each end user. Other download managers are statically configured to report a predetermined set of information to one or more predefined locations. In order for the content provider or CDN to change what information gets reported and where the information is reported to, the content provider or CDN recodes and recompiles the download manager and it is for this reason that most content providers and CDNs provide a proprietary closed download manager that cannot be used by other content providers or CDNs.

V. Computer System

Many of the above-described processes and components are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Computer and computing machine is meant in its broadest sense, and can include any electronic device with a processor including cellular telephones, smartphones, portable digital assistants, tablet devices, laptops, notebooks, servers, and desktop computers. Examples of computer readable media include, but are not limited to, CD-ROMs, flash drives, RAM chips, hard drives, EPROMs, etc.

Figure 9:
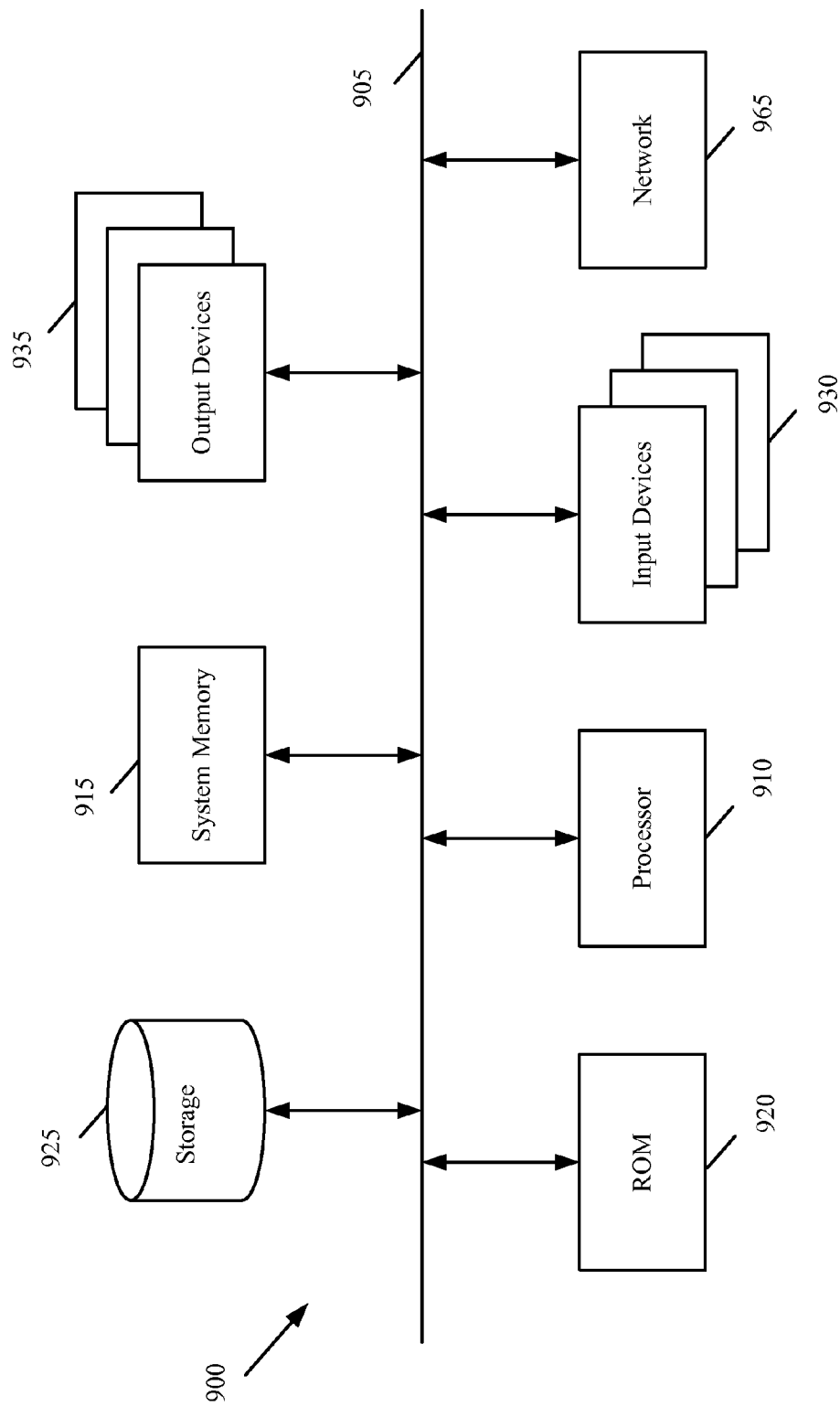
FIG. 9 illustrates a computer system or server with which some embodiments are implemented.

FIG. 9 illustrates a computer system or server with which some embodiments are implemented. Such a computer system includes various types of computer readable mediums and interfaces for various other types of computer readable mediums that implement the various processes and modules described above (e.g., the download manager application and configuration file). Computer system 900 includes a bus 905, a processor 910, a system memory 915, a read-only memory 920, a permanent storage device 925, input devices 930, and output devices 935.

The bus 905 collectively represents all system, peripheral, and chipset buses that communicatively connect the numerous internal devices of the computer system 900. For instance, the bus 905 communicatively connects the processor 910 with the read-only memory 920, the system memory 915, and the permanent storage device 925. From these various memory units, the processor 910 retrieves instructions to execute and data to process in order to execute the processes of the invention. The processor 910 is a processing device such as a central processing unit, integrated circuit, graphical processing unit, etc.

The read-only-memory (ROM) 920 stores static data and instructions that are needed by the processor 910 and other modules of the computer system. The permanent storage device 925, on the other hand, is a read-and-write memory device. This device is a non-volatile memory unit that stores instructions and data even when the computer system 900 is off. Some embodiments of the invention use a mass-storage device (such as a magnetic or optical disk and its corresponding disk drive) as the permanent storage device 925.

Other embodiments use a removable storage device (such as a flash drive) as the permanent storage device Like the permanent storage device 925, the system memory 915 is a read-and-write memory device. However, unlike storage device 925, the system memory is a volatile read-and-write memory, such a random access memory (RAM). The system memory stores some of the instructions and data that the processor needs at runtime. In some embodiments, the processes are stored in the system memory 915, the permanent storage device 925, and/or the read-only memory 920.

The bus 905 also connects to the input and output devices 930 and 935. The input devices enable the user to communicate information and select commands to the computer system. The input devices 930 include alphanumeric keypads (including physical keyboards and touchscreen keyboards), pointing devices (also called "cursor control devices"). The input devices 930 also include audio input devices (e.g., microphones, MIDI musical instruments, etc.). The output devices 935 display images generated by the computer system. The output devices include printers and display devices, such as cathode ray tubes (CRT) or liquid crystal displays (LCD).

Finally, as shown in FIG. 9, bus 905 also couples computer 900 to a network 965 through a network adapter (not shown). In this manner, the computer can be a part of a network of computers (such as a local area network ("LAN"), a wide area network ("WAN"), or an Intranet, or a network of networks, such as the internet. For example, the computer 900 may be communicably coupled through the network 965 to an ingest server, mid-tier server, edge server, content provider streaming server, or end user device.

As mentioned above, the computer system 900 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for operating a reconfigurable container application to manage content downloads for content that is supplied by a plurality of content providers, said method comprising:

providing from a content delivery network (CDN), a container application for downloading content of any of the plurality of content providers from at least one caching server of a plurality of caching servers operated by the CDN;

identifying, at a site operated by a particular content provider of the plurality of content providers, invocation of a link to download particular content;

passing, responsive to said invocation, a configuration file for the container application from the particular content provider site, said configuration file comprising (i) an identifier identifying at least one CDN caching server that is tasked with delivering the particular content on behalf of the particular content provider, (ii) a first condition that is defined to trigger while downloading the particular content from the at least one CDN caching server, (iii) a second condition that is defined to trigger at completion of the particular content download, and (iv) reporting parameters that identify what information to report and to whom said information is reported when the first condition or the second condition is triggered; and initializing the container application with the configuration file, said initializing comprising configuring the container application to download the particular content, measure the particular content download performance from the at least one CDN caching server, provide to the particular content provider a first set of reports measuring the particular content download performance when the first condition is triggered, and provide to the CDN a second set of reports measuring the particular content download performance when the second condition is triggered.

2. The method of claim 1, wherein said configuration file further comprises a plurality of configurable attributes that modify (i) operation of said container application and (ii) reporting of said container application without modifying code of said container application.

3. The method of claim 1, wherein the configuration file is a first configuration file and the particular content provider is a first content provider, the method further comprising providing a second configuration file for reconfiguring said container application to download content of a second content provider.

4. The method of claim 1, wherein the configuration file further configures a display of said container application with at least one of an advertisement and engaging content.

5. The method of claim 4, wherein said engaging content comprises content that is related to said particular content.

6. The method of claim 4, wherein said engaging content comprises at least one of (i) interactive content and (ii) video content.

7. The method of claim 1, wherein said reporting parameters comprise at least one error that occurred during the download of the particular content, said error identifying a reason for a failed download of the particular content.

8. The method of claim 1, wherein said application comprises functionality for pausing, resuming, and reestablishing a download.

9. The method of claim 1, wherein the first reporting condition is configured to trigger when the download reaches a specified percentage of completion without error.

10. The method of claim 1, wherein the first reporting condition is configured to trigger when the download continues for a specified duration.

11. A method for configurable content download management, wherein the content is downloaded from a content delivery network (CDN) that operates a plurality of caching servers, and wherein the content is supplied by a plurality of content providers that offload delivery of the content to the CDN caching servers, the method comprising:

providing from the CDN, an application for managing downloads of content provider content;

passing a first configuration file to an instance of the application running on a user machine, the first configuration file comprising (i) a first identifier specifying an address to a first CDN caching server from which the application is to begin downloading content of a particular content provider of the plurality of content providers, (ii) a first condition for causing the application to report download performance provided by the first caching server upon reaching a particular point during download of the particular content, (iii) a second condition that is defined to trigger when the download performance falls below a specified threshold during download of the particular content, and (iv) reporting parameters that identify what to report as part of said download performance and to whom said download performance is reported when the first condition is triggered;

commencing download of the particular content from the first CDN caching server to the application running on the user machine;

receiving, in response to triggering of the first condition, download performance of the first caching server from the application running on the user machine while continuing download of the particular content;

passing a second configuration file to the application running on the user machine when the second condition triggers in response to the download performance provided by the first caching server falling below the specified threshold, the second configuration file reconfiguring the application to continue the particular content download from a different second CDN caching server.

12. The method of claim 11, wherein the second configuration file further reconfigures to halt the particular content download from the first CDN caching server.

13. The method of claim 11 further comprising halting the particular content download from the first CDN caching server and continuing the particular content download from the second CDN caching server.

14. The method of claim 11, wherein the first configuration file further comprises a link to a visual banner identifying the particular content provider, and wherein the application displays the visual banner while the application downloads the particular content from the first CDN caching server.

15. The method of claim 11, wherein the first configuration file further comprises a tag specifying an amount of download completion at which the application reports the download performance to the CDN.

16. A method for operating a reconfigurable container application to manage content downloads for content that is supplied by a plurality of content providers, said method comprising:

operating a plurality of servers as a content delivery network (CDN) delivering content of the plurality of content providers on behalf of the plurality content providers;

providing from the CDN, a container application for downloading content of any of the plurality of content providers from the plurality of servers of the CDN, wherein each content provider of the plurality of content providers customizes the container application using a configuration file, and wherein a particular content provider of the plurality of content providers defines a first configuration file with (i) an identifier specifying an address of a first CDN server from which to download particular content, (ii) a first trigger for initiating an interactive session with the particular content provider when a specified first condition is encountered during the particular content download, (iii) a second trigger for reporting on performance of the particular content download when a specified second condition is encountered during the particular content download, and (iv) reporting parameters that identify what to report as part of said performance and to whom said performance is reported when the second condition is triggered;

initiating delivery of the particular content from the first CDN server to an instance of the container application configured with the first configuration file and running on a specific user machine;

establishing the interactive session between the specific user machine and the particular content provider according to the first configuration file when the specified first condition is encountered during the particular content download; and receiving the performance of the particular content download from the container application when the specified second condition is encountered during the particular content download.

17. The method of claim 16, wherein the specified second condition specifies a download completion amount at which the application reports download performance provided by the first CDN server.

18. The method of claim 16 further comprising passing a second configuration file to the container application running on the specific user machine when the download performance is below a specified threshold, the second configuration file reconfiguring the container application to transition download of the particular content from the first CDN server to a second CDN server.

* * * * *